United States Patent [19]
Higuchi et al.

[11] 3,840,099
[45] Oct. 8, 1974

[54] FORWARD-REVERSE CLUTCH CONTROL APPARATUS

[75] Inventors: Shunichiro Higuchi, Kazunobu Katayose, both of Yokohama, Japan

[73] Assignee: Okamura Manufacturing Company Limited, Yokohoma, Japan

[22] Filed: Jan. 26, 1972

[21] Appl. No.: 220,760

[30] Foreign Application Priority Data
Feb. 1, 1971  Japan.................................. 46/3281

[52] U.S. Cl............... 192/4 A, 192/13 R, 192/3.33, 192/87.19, 91/391 R, 251/229
[51] Int. Cl........................ F16h 57/10, F16d 67/04
[58] Field of Search.................... 192/4 A, 4 C, 13 R

[56]        References Cited
           UNITED STATES PATENTS
3,613,844   10/1971   Asano et al....................... 192/13 R
3,292,752   12/1966   Schuster et al................. 192/4 A X Primary Examiner—Benjamin W. Wyche
Attorney, Agent, or Firm—Spensley, Horn & Lubitz

[57]              ABSTRACT

A power transmission having a selector valve for directing fluid under pressure to either of two hydraulically operated clutches, causing a vehicle to drive forwardly or rearwardly. The selector valve has a pair of spools and is manually operated to set the position of the spools. The spools are also operable upon application of the brake so that the vehicle may be stopped or "inched" without changing the preset position of the selector valve.

7 Claims, 4 Drawing Figures

FORWARD-REVERSE CLUTCH CONTROL APPARATUS

BACKGROUND OF THE INVENTION

1. Field of the Invention

This invention relates to automobile vehicle equipped with hydraulically operated power transmissions including means for automatically disengaging or causing slipping in the transmission upon application of braking operation in the barke system.

2. Prior Art

In the power transmission mechanism of, for instance, a fork lift or other heavy duty vehicles where power is transmitted through a torque converter or other fluid coupling, usually the output shaft of the transmission gear is selectively engaged with either of two hydraulic clutches, and pressurized fluid to the clutches is controlled by means of a selector valve to direct the flow of fluid either of two clutches or to divert the flow of fluid away from both clutches. Engagement with one of the clutches causes the vehicle to be driven in the forward direction and engagement with the other clutch causes the vehicle to be driven in the reverse direction.

In such a mechanism, when it is desired to interrupt the power transmission to a driven member or to rotate the latter at a very low rate, it needs to declutch or to effect slipping of the clutches in association with operation of the brake system. One solution was disclosed in the U.S. Pat. No. 2,786,368 to Cook. According to Cook, a release valve which cooperates with the brake system, is provided at a position prior to the connection to a selector valve and operates, upon application of the brake, to interrupt flow of pressurized fluid to the clutches from the fluid source regardless of the position of the selector valve. However, such a system requires two different types of valves, which makes the structure and piping arrangement complicated and requires skillful attention for adjustment and operation of the system. Further it has been experienced that accurate and proper control cannot be obtained without difficulty.

BRIEF SUMMARY OF THE INVENTION

The present invention has for its object to eliminate the drawbacks inherent to the conventional device such as referred to above, by providing an improved system in which power transmission is readily controlled by operation of a brake pedal for interrupting the power transmission or allowing imperfect transmission of power causing the driven shaft to rotate at a very low rate, while maintaining the selector valve at a position to actuate the selected clutch to place its transmission of drive.

DETAILED DESCRIPTION OF THE DRAWINGS

Figure 1:
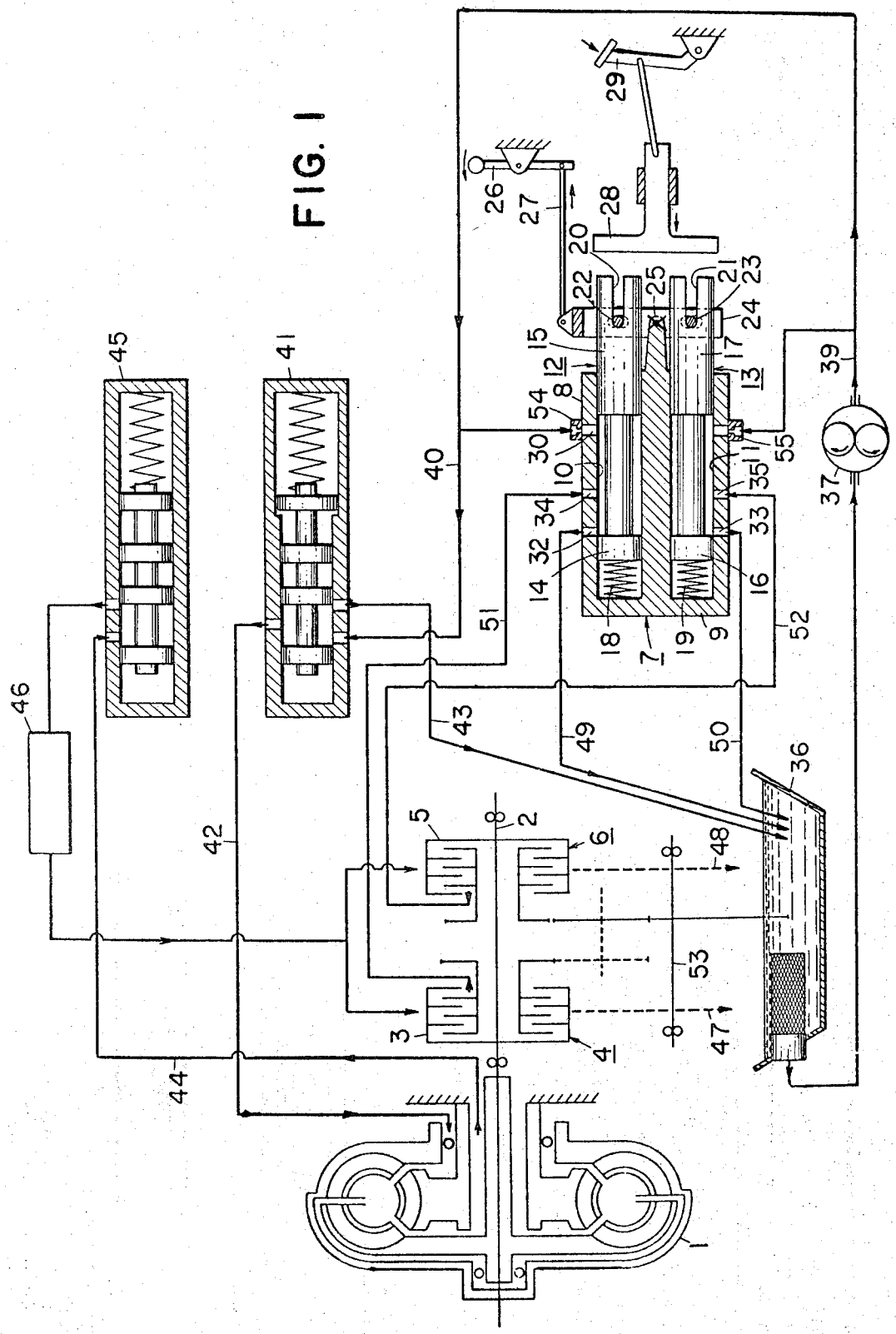
FIG. 1 is a schematic drawing of a preferred embodiment of the invention.

In the drawing, numerical reference 1 is applied to a torque converter which is connected to an engine not shown of an automovile vehicle. The output shaft 2 of the torque converter is provided with clutch discs 3 of the forward drive clutch 4 and clutch discs 5 of the rearward drive clutch 6.

Numerical reference 7 is applied to the selector valve of which housing 8 is opened at an end thereof and is closed at the other end by an end wall 9. The selector valve 7 includes a pair of valve chambers in the form of cylinders 10 and 11 for slidably receiving spools 12 and 13, respectively. The spools are provided with a pair of spaced apart pistons 14 and 15 and 16 and 17, respectively. The valve housing 8 has three ports for communication of the valve chambers to fluid lines connected to a pressurized fluid source, as will be fully explained hereinafter.

Springs 18 and 19 are disposed between the end wall 9 of the valve housing 8 and the inner pistons 14 and 16 of the spools 12 and 13 to bias each spool in a direction toward the open end of the valve housing. To place the spools 12 and 13 in positions in the valve housing 8, the spools have at the respective free ends slots 20 and 21 which slidably engage with pins 22 and 23, respectively, provided on a lever 24 pivoted to the intermediate portion thereof to the valve housing at 25 so that the lever rocks about the pivot 25. The rocking lever 24 is linked to a change lever 26 by means of a rod 27. Arranged at a position in proximity to the free ends of the spools 12 and 13 is an actuator 28 which is adapted to be moved to and fro with respect to the spools by operation of a brake pedal 29.

Three ports are provided each for the valve chambers or cylinders 10 and 11; these are inlet ports 30 and 31, exchaust ports 32 and 33, clutch supply ports 34 and 35. The inlet ports 30 and 31 are connected to a fluid source 36 through a pump 37 by ways of passages 38 and 39. The passage 39 which connects between both inlet ports is branched by a passage 40 to a regulator valve 41 so that fluid drawn from the pump 37 is supplied to the inlet ports 30 and 31 at a constant pressure. The constant pressure regulating valve 41 supplied pressurized fluid to the torque converter 1 thrhough a conduit 42. Another conduit 43 is provided to the regulator valve 41 so as to return excess of fluid to the reservoir 36. In addition to the fluid conduit 42, there is another conduit 44 which communicates the torque converter 1 with a second regulator vavle 45 so that a constant pressure is maintained in the torque converter. Fluid which is drawn from the second regulator valve 45, is supplied to the clutches 4 and 6 through a cooler 46 for lubrication of the clutches. The lubrication fluid is returned to the fluid reservoir 36 through conduits 47 and 48.

The exhaust ports 32 and 33 on the valve housing 8 are adapted to return fluid to the reservoir 36 from the valve chambers 10 and 11 through conduits 49 and 50, respectively.

The clutch supply port 34 supplies fluid under pressure to the forward drive clutch 4 from the valve chamber 10 through a conduit 51, while the port 35 supplies fluid under pressure to the rearward drive clutch 6 through a conduit 52.

Referring now to the operation of the mechanism disclosed, it may be assumed that the vehicle is to be driven forward. At this time, the vehicle operator operates the change lever 26 to rotate about its pivot in a counter clockwise direction in FIG. 1. As a result the rocking lever 24 rotates about its pivot 25 in a clockwise direction as shown in FIG. 2. Thus the spools 12 and 13 will be shifted to the positions shown in FIG. 2, where the inner piston 14 of the spool 12 closes the exhaust port 32 of valve chamber 10. Thus a predetermined pressure will be developed in line 51 to force the clutch discs 3 to engage with the associated clutch discs which are connected to the wheel axle 53 of the vehicle (FIG. 1), causing the vehicle to drive forwardly.

Figure 3:
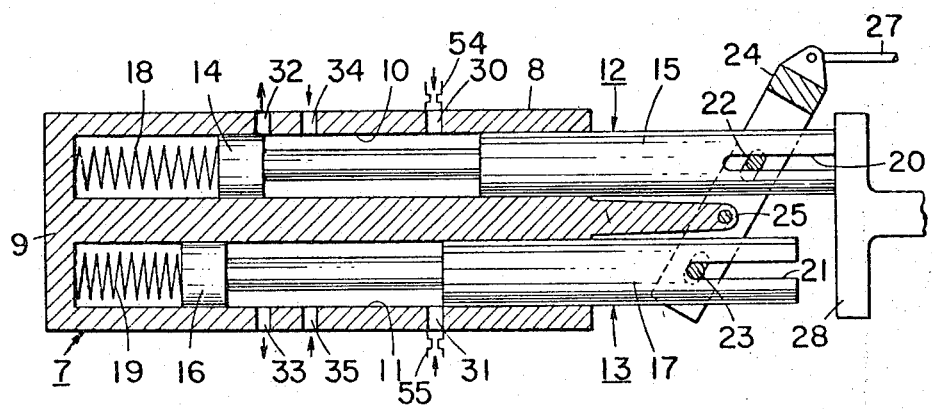
FIG. 3 is a view similar to FIG. 2 but showing the selector valve in a condition such that upon application of the brake the forward clutch will slip.

While running the torque converter at a rapid rate to drive the vehicle powerfully, it is often necessary that the engine move the vehicle merely a small amount, or "inch" the vehicle. This is accomplished by applying an adjusted pressure on the brake pedal 29. When the brake pedal is depressed at a controlled rate, the actuator 28 engages to and shifts the spool 12 inwardly into the cylinder 10 until the inner piston 14 opens the exhaust port 32 partially, while maintaining the rocking lever 24 at the preset position as shown in FIG. 3. Thus the fluid pressure in line 51 will be lowered to an extent that slippage occurs in the forward drive clutch 4. The vehicle driver can therefore utilize the brake pedal to effect "inching" of the vehicle by his controlled depression of the pedal.

Figure 4:
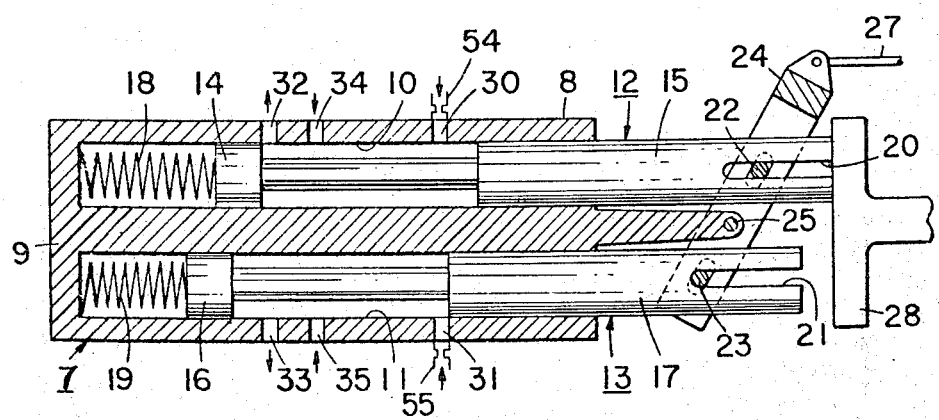
FIG. 4 is a view similar to FIG. 2 but showing the selector valve in a neutral position while maintaining its forward drive phase.

The full braking operation on the pedal 29 shifts the spool 12 further into the cylinder 10 as shown in FIG. 4, thus channeling the pressurized fluid in the valve chamber 10 to the reservoir 36 through the fully opened exhaust port 32. It will be apparent that relief of depression from the brake pedal 29 returns the spool 12 to the preset position as shown in FIG. 2 for forwardly driving the vehicle again.

As illustrated in the drawings, the inlet ports 30 and 31 are so designed that they are always opened to the fluid source, though the ports are throttled by choke tubes 54 and 55, respectively. Thus, there remains a continuous flow of fluid through the valve chamber of which exhaust port is opened to declutch either clutch by operation of the change lever 26. This arrangement will avoid the valve chamber connected to the declutched clutch from being emptied which creates a trouble of time-lag in the operation of clutching of the same clutch. As the continuous flow of fluid through the opened valve chamber is restricted by the choke tube. Thus, the relief of fluid pressure through the opened valve chamber will not inoperatively lower the fluid pressure in the line to the clutched clutch.

Figure 2:
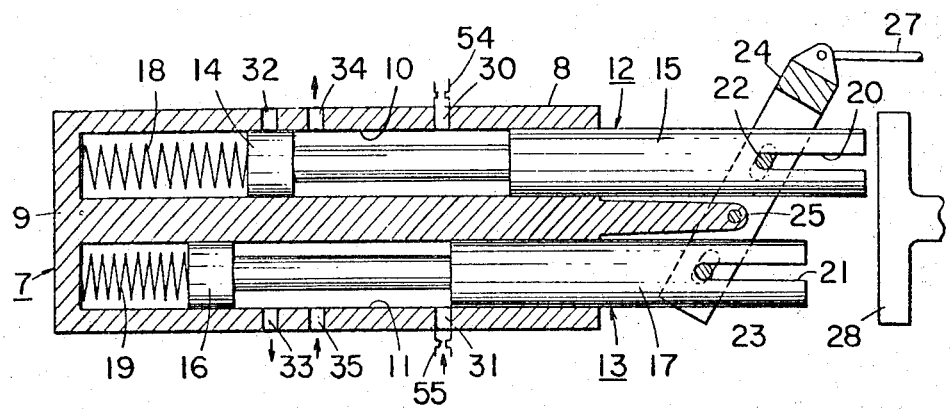
FIG. 2 is an enlarged sectional view of the selector valve in a condition to clutch the forward drive clutch.

If the vehicle should now be driven rearwardly, the drive operates the change lever 26 to rotate in a clockwise direction in FIG. 1. As a result, the spools 12 and 13 will be set oppositely in contrast with that of shown in FIG. 2, where the line 51 is blocked from the fluid pressure and there is established a channel of fluid under pressure in line 52 for effecting the clutching of the rearward drive clutch 6. As aforementioned, upon application of the brake the vehicle may be desirably stopped or inched.

While but one form of the invention has been selected for a description thereof, other forms will be apparent to those skilled in the art. For example, slots 20 and 21 on the free ends of the spools 12 and 13 may be substituted by pins, while providing such slots on the rocking lever 24. As the operation of the brake pedal is a relative control, it may be readily modified to pull the spools instead of the depression control as shown.

We claim:

1. A forward-reverse clutch control apparatus for use with a vehicle comprising:
   a. a first hydraulically operated clutch;
   b. a second hydraulically operated clutch;
   c. a selector valve adapted to selectively receive hydraulic fluid under pressure from said first and second clutches and interrupt the fluid supply from both of said first and second clutches, said selector valve having a pair of reciprocating spools, each of said spools being axially reciprocated along the longitudinal axis thereof to activate one said first and second clutches respectively;
   d. braking means for braking the vehicle on which the mechanism is mounted;
   e. a manually operated member having means coupled to said spools for shifting said spools in said selector valve to alternately establish a channel of pressurized fluid from said first and second clutching; and
   f. actuator means coupled to said braking means and adapted to longitudinally shift the position of said spools causing said selector valve to move into a neutral condition, irrespective of the position of said manually operated member, upon activation of said braking means.

2. A forward-reverse clutch control apparatus as defined in claim 1, in which said manually operated member comprises a change lever pivotable about a pivot intermediate said pair of spools, each of said spools coupled to said lever and being reciprocally movable with respect to each other upon operation of said change lever.

3. A forward-reverse clutch control apparatus as defined in claim 1 wherein said spools are in uniform, spaced relation to said actuator means.

4. A forward-reverse clutch control apparatus as defined in claim 1 wherein said selector valve comprises a pair of aligned cylinders, each cylinder having a fluid inlet port, a reservoir outlet port and a clutch fluid supply port, the clutch fluid supply port of each cylinder being coupled to one of said first and second hydraulically operated clutches respectively, first and second spools each resiliently disposed within one of said cylinders, each of said spools comprising an inner piston and an outer piston in slidable contact with said cylinder and in axial alignment with each other, said inner and outer pistons being coupled to each other by means for permitting said respective fluid inlet port, said clutch fluid supply port and said reservoir outlet port to be in communication with one another.

5. A forward-reverse clutch control apparatus as defined in claim 4 wherein said inner and outer pistons are coupled by a concentric member in axial abutment with each of said inner and outer pistons.

6. A forward-reverse clutch control apparatus for use with a vehicle comprising:
   a. first and second hydraulically operated clutches;
   b. braking means for braking the vehicle on which the mechanism is mounted;
   c. a manually operated member having first and second piston means for operating said first and second hydraulically operated clutches respectively;
   d. a selector valve having a pair of aligned cylinders disposed therein, each cylinder having a fluid inlet port, a clutch fluid supply port and a reservoir outlet port, the clutch fluid supply port of each cylinder being coupled to one of said first and second hydraulically operated clutches respectively, first and second spools each reciprocally disposed within one of said cylinders, each of said spools comprising an inner piston and an outer piston in slidable contact with said cylinder and in axial alignment with each other, said inner and outer pistons being coupled to each other by means for permitting said respective fluid inlet port, said clutch fluid supply port, and said reservoir outlet port to be in communication with each other;

e. means for coupling each of said outer pistons to one of the first and second positions of said manually operated member whereby each position of said manually operated member slidably moves one of said spools to allow closure of the respective reservoir outlet ports; and f. means coupled to said braking means for urging said spools within said cylinder permitting said fluid inlet port to communicate with both of said clutch fluid supply port and said reservoir outlet port upon activation of said braking means.

7. A forward-reverse clutch control apparatus as defined in claim 6 wherein said inner and outer pistons are coupled by a concentric member in axial abuttment with said inner and outer pistons, said concentric member defining a uniform space intermediate said concentric member and said cylinder.

* * * * *